US009882960B2

(12) United States Patent
Panchapakesan et al.

(10) Patent No.: US 9,882,960 B2
(45) Date of Patent: Jan. 30, 2018

(54) SECURITY FRAMEWORK FOR MEDIA PLAYBACK

(71) Applicant: AIRWATCH LLC, Atlanta, GA (US)

(72) Inventors: Ramani Panchapakesan, Bangalore (IN); Sivaji Koya, Bangalore (IN); Anshuman Biswal, Bangalore (IN); Suman Das, Bangalore (IN)

(*) Notice: Subject to any disclaimer, the term of this patent is extended or adjusted under 35 U.S.C. 154(b) by 246 days.

(21) Appl. No.: 14/691,596

(22) Filed: Apr. 21, 2015

(65) Prior Publication Data

US 2016/0191479 A1    Jun. 30, 2016

(30) Foreign Application Priority Data

Dec. 30, 2014   (IN) .......................... 6744/CHE/2014

(51) Int. Cl.
  *H04L 29/06*       (2006.01)
  *H04L 29/08*       (2006.01)
  *H04W 12/02*       (2009.01)
(52) U.S. Cl.
  CPC .......... *H04L 67/02* (2013.01); *H04L 65/4084* (2013.01); *H04L 65/4092* (2013.01); *H04W 12/02* (2013.01); *H04L 63/0435* (2013.01)
(58) Field of Classification Search
  CPC . H04L 67/02; H04L 65/4048; H04L 65/4092; H04W 12/02
  See application file for complete search history.

(56) References Cited

U.S. PATENT DOCUMENTS

| | | | | |
|---|---|---|---|---|
| 7,120,751 | B1* | 10/2006 | Endo | G06F 12/0802 709/226 |
| 7,548,948 | B2* | 6/2009 | Klemets | H04N 5/76 709/203 |
| 7,840,693 | B2* | 11/2010 | Gupta | G06Q 30/0242 709/219 |
| 8,429,081 | B1* | 4/2013 | Dronamraju | G06F 21/10 380/201 |
| 2008/0027864 | A1* | 1/2008 | Lin | G06Q 30/02 705/50 |
| 2009/0006771 | A1* | 1/2009 | Freeman | G06F 9/5016 711/147 |

(Continued)

OTHER PUBLICATIONS

Dthce Action for Application No. 141691,598 mailed Nov. 16, 2017.

(Continued)

*Primary Examiner* — Khoi Le
(74) *Attorney, Agent, or Firm* — Thomas | Horstemeyer, LLP

(57) ABSTRACT

Disclosed are various embodiments relating to a security framework for media playback. In one embodiment, a client device has a decryption module, a streaming module, and a playback module. The playback module may be configured to request media data from the streaming module and render the media data on an output device. The streaming module may be configured to obtain the media data from the decryption module by a request that specifies a size of the media data. The size may be dynamically determined based at least in part on an amount of available temporary data storage. The decryption module may be configured to decrypt a portion of an encrypted media file based at least in part on the specified size to produce the media data.

20 Claims, 9 Drawing Sheets

(56) References Cited

U.S. PATENT DOCUMENTS

| | | | |
|---|---|---|---|
| 2011/0145560 A1* | 6/2011 | Moon | H04N 21/23432 713/150 |
| 2013/0061045 A1* | 3/2013 | Kiefer | H04L 9/0819 713/160 |
| 2013/0326583 A1 | 12/2013 | Freihold et al. | |
| 2015/0046812 A1 | 2/2015 | Darby et al. | |
| 2016/0004388 A1 | 1/2016 | Lee et al. | |

OTHER PUBLICATIONS

Nallace Jackson, Android Apps for Absolute Beginners, Aug. 16, 2014, Apress, pp. 1-3.

* cited by examiner

SECURITY FRAMEWORK FOR MEDIA PLAYBACK

CROSS-REFERENCE TO RELATED APPLICATIONS

Benefit is claimed under 35 U.S.C. 119(a)-(d) to Foreign application Serial No. 6744/CHE/2014 filed in India entitled "SECURITY FRAMEWORK FOR MEDIA PLAYBACK", on Dec. 30, 2014, by AIRWATCH LLC, which is herein incorporated in its entirety by reference for all purposes This application is also related to U.S. patent application Ser. No. 14/691,598, entitled "FLOATING MEDIA PLAYER" which is assigned to the assignee of this application and has been filed on the same day as this application.

BACKGROUND

Mobile devices are increasingly being used to play back a variety of media, including video streams, audio streams, slide shows, and other forms of media. Although mobile devices may lack digital video disc (DVD) drives and have less data storage than desktop workstations, WI-FI and 4G wireless technologies may make it possible to stream videos and other high bitrate media to the devices. A typical media playback experience upon a mobile device involves a full-screen presentation. If the user wishes to work in another application, the user may have to send the media player to the background and switch to the other application.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
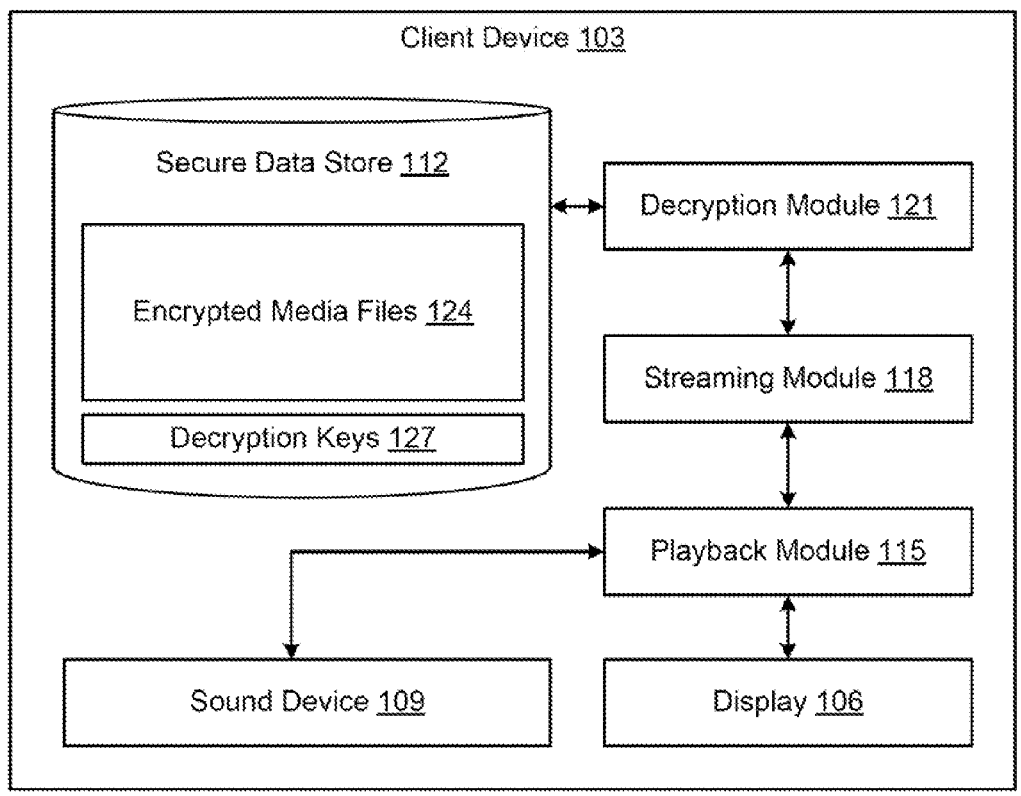
FIG. 1 is a schematic block diagram of a client device according to various embodiments of the present disclosure.

The present disclosure relates to media players and a security framework therefor. Secure management of digital media can be challenging. Content rights must be protected against dangers of unauthorized copying. Unauthorized copying may be problematic from the standpoint of media piracy. In some cases, media items may be confidential and proprietary to a business organization, and any disclosure may harm the interests of the business organization. In other cases, media items may be personal for a user, and any disclosure would violate the privacy of the user. One approach to maintaining security of media items would be to encrypt the media files and to decrypt them when they are played back. However, this approach creates a full copy of the decrypted media item, which may allow the copy as a whole to be intercepted on the device or during transit to the device.

Various embodiments of the present disclosure provide approaches that involve decryption of portions of encrypted media files while they are being played back or consumed. By decrypting portions of the files when they are needed, the entire decrypted copy of the media item is not stored in memory. Consequently, security of the media items is enhanced. Embodiments of the present disclosure leverage a streaming-based architecture to provide chunk-by-chunk decryption of encrypted media files. Such embodiments may implement random access into the media file with a specified starting offset. Further, such embodiments may allow for variable size chunks to be produced and consumed, depending on the available memory of the client device.

The present disclosure also relates to media player user interfaces. Increasingly, client devices are using non-windowed operating systems in which a single application is rendered in a full-screen mode. For example, client devices may be executing operating systems such as ANDROID or IOS, which embody this characteristic. Such client devices may have relatively small size displays, for which use of the entire display (or nearly the entire display) for an application may be preferred. Nonetheless, users may execute multiple applications, but the users may have to switch back and forth among the applications, a cumbersome procedure.

With respect to media players, a user may wish to watch a movie or slide show or listen to an audio program for an extended period of time. However, the user may wish to view a document, check email, send a text message, or perform other functionality while the media is being played back. With a non-windowed operating system, the user may have to send the media player to the background, which may cause the playback to stop or may at least hide the media player user interface.

Various embodiments of the present disclosure provide floating media player user interfaces that allow the media player user interface to continue to be shown while the user interface of another application is also rendered. As a non-limiting example, a user may be playing back a movie in a media player and may wish to switch to a social network application. The user may double tap the media player user interface, causing it to shrink to a smaller size. By shrinking to a smaller size user interface, the user interface of the social network application may be exposed underneath the media player user interface. Although a portion of the social network application user interface may be hidden or obscured underneath the media player user interface, the user may drag the media player user interface to another location and/or resize the media player user interface. The user may then interact with the social network application user interface while playback of the movie continues. When finished with the social network application, the user may double tap the media player again, causing the media player user interface to enter a full-screen mode once more.

In the following discussion, a general description of the system and its components is provided, followed by a discussion of the operation of the same.

With reference to FIG. 1, shown is a client device 103 according to various embodiments of the present disclosure. The client device 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 103 may include a display 106, a sound device 109, and a secure data store 112.

Various systems and/or other functionality may be executed in the client device 103 according to various embodiments. In particular, a playback module 115, a streaming module 118, and a decryption module 121 may be executed in the client device 103. Additional applications such as browser applications, text messaging applications, social network applications, document viewing applications, and so on may also be executed in the client device 103.

The playback module 115 may correspond to a media player application configured to play back various types of media items. Such media items may include video files, audio files, slide show files, and/or other media files. The playback module 115 may be configured to obtain media item data from the streaming module 118 for playback.

The streaming module 118 may correspond to a streaming server and may be configured to respond to requests for media items from the playback module 115. The streaming module 118 may employ a streaming protocol such as, for example, hypertext transfer protocol (HTTP), real-time transport protocol (RTP), real time streaming protocol (RTSP), samba, and/or other protocols.

The decryption module 121 may be configured to respond to requests for decrypted chunks of encrypted media files 124 by the streaming module 118. To this end, the decryption module 121 may utilize one or more decryption keys 127 to decrypt a portion of one of the encrypted media files 124.

The secure data store 112 includes encrypted media files 124, decryption keys 127, and/or other data. In some cases, the data stored by the secure data store 112 may be obtained over a network from another computing device. The secure data store 112 may be maintained in a secure manner such that only the decryption module 121 has access to the decryption keys 127 and/or the encrypted media files 124. The encrypted media files 124 may correspond to video files, audio files, slide show files, and/or other media files. In one embodiment, the encrypted media files 124 are encrypted using a block cipher such as an Advanced Encryption Standard (AES) block cipher. In one embodiment, the block size is set at 256 bytes.

Figure 2:
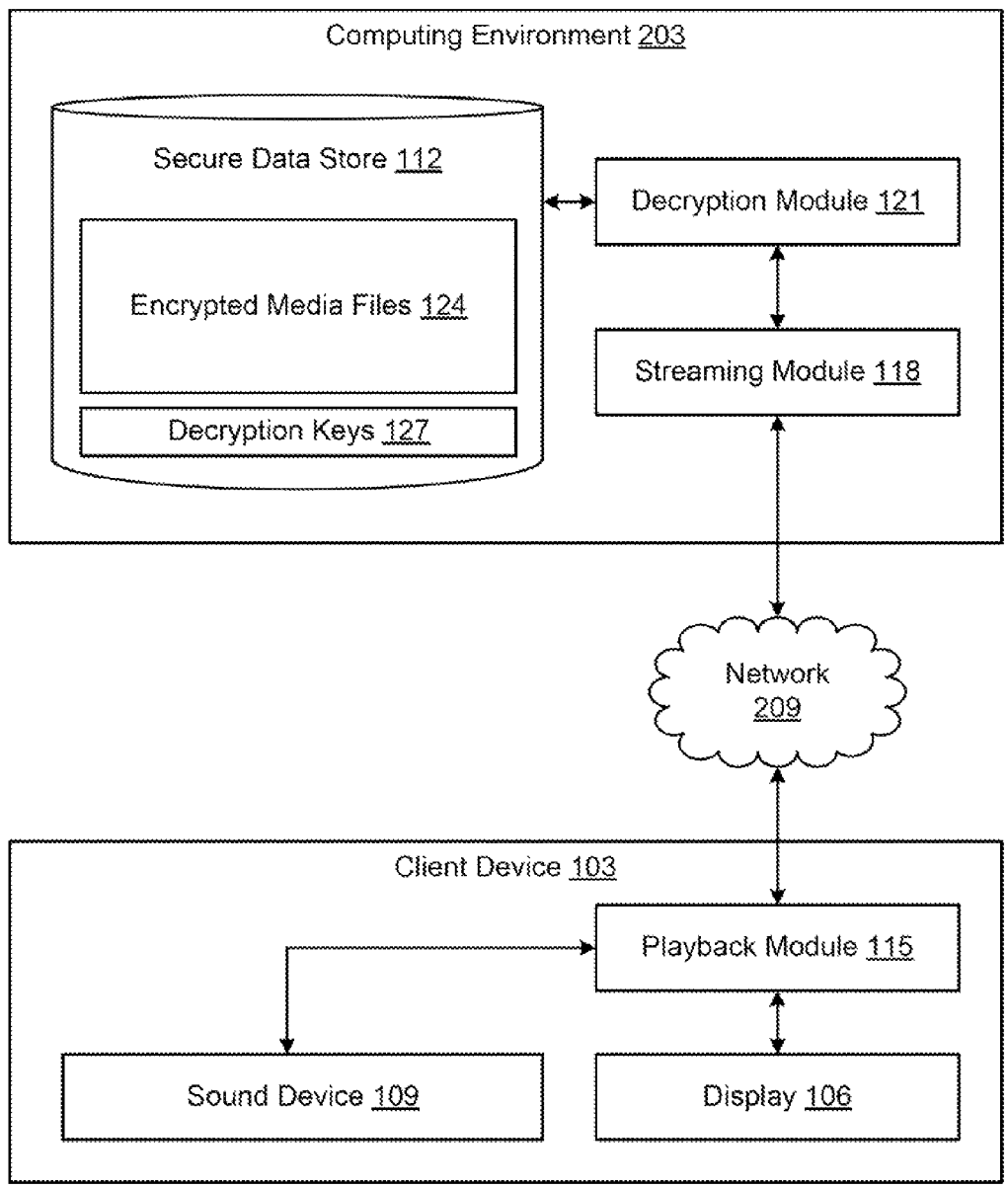
FIG. 2 is a schematic block diagram of a networked environment according to various embodiments of the present disclosure.

Although the embodiments of FIG. 1 include the decryption module 121, the streaming module 118, and the playback module 115 on a single client device 103, it is understood that the decryption module 121, the streaming module 118, and the playback module 115 may be executed by separate computing devices in other embodiments, such as the embodiments represented by FIG. 2.

With reference to FIG. 2, shown is a networked environment 200 according to various embodiments. The networked environment 200 includes a computing environment 203 and a client device 103 in data communication with each other via a network 209. The network 209 includes, for example, the Internet, one or more intranets, extranets, wide area networks (WANs), local area networks (LANs), wired networks, wireless networks, other suitable networks, or any combination of two or more such networks. For example, such networks 209 may comprise satellite networks, cable networks, Ethernet networks, telephony networks, and other types of networks.

The computing environment 203 may comprise, for example, a server computer or any other system providing computing capability. Alternatively, the computing environment 203 may employ multiple computing devices that may be arranged, for example, in one or more server banks, computer banks, or other arrangements. Such computing devices may be located in a single installation or may be distributed among many different geographical locations. For example, the computing environment 203 may include multiple computing devices that together form a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time. The computing environment 203 may also include or correspond to one or more virtualized server instances that are created in order to execute the functionality that is described herein.

Various systems and/or other functionality may be executed in the computing environment 203 according to various embodiments. Also, various data is stored in a secure data store 112 that is accessible to the computing environment 203. The secure data store 112 may be representative of a plurality of secure data stores 112. The data stored in the secure data store 112, for example, is associated with the operation of the various systems and/or functional entities described below.

In FIG. 2, the decryption module 121 and the streaming module 118 are located server-side, while the playback module 115 is located client-side. The playback module 115 and the streaming module 118 may interact in a similar manner as in FIG. 1. It is noted that the decrypted chunks of media data passed by the streaming module 118 to the playback module 115 may occur over a separately encrypted channel using secure sockets layer (SSL), transport layer security (TLS), and/or other encryption approaches.

Figure 3:
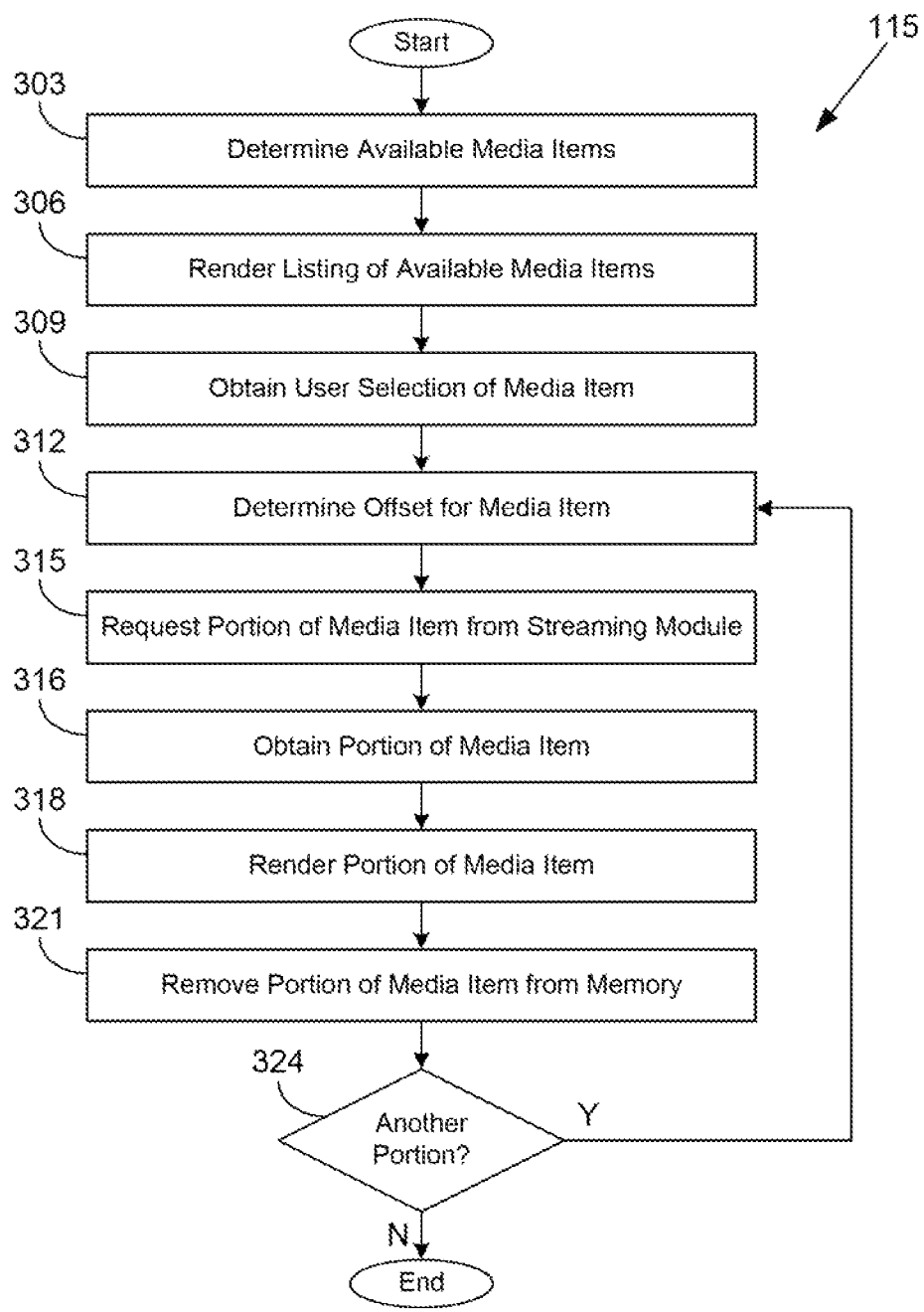
FIG. 3 is a flowchart illustrating one example of functionality implemented as portions of a playback module executed in the client device of FIG. 1 or 2 according to various embodiments of the present disclosure.

Referring next to FIG. 3, shown is a flowchart that provides one example of the operation of a portion of the playback module 115 according to various embodiments. It is understood that the flowchart of FIG. 3 provides merely an example of the many different types of functional arrangements that may be employed to implement the operation of the portion of the playback module 115 as described herein. As an alternative, the flowchart of FIG. 3 may be viewed as depicting an example of elements of a method implemented in the client device 103 (FIGS. 1 & 2) according to one or more embodiments.

Beginning with box 303, the playback module 115 determines available media items corresponding to the encrypted media files 124 (FIGS. 1 & 2). The playback module 115 may request a listing from a local service or network service, or the playback module 115 may query the secure data store 112 directly. Availability may depend upon the presence of an authenticated user at the client device 103. In this regard, the user may have to supply security credentials (e.g., username, password, etc.) and/or authenticate using biometric identification (e.g., face recognition, voice recognition, fingerprint recognition, etc.). In box 306, the playback module 115 may render the listing of available media items upon the display 106 (FIGS. 1 & 2).

In box 309, the playback module 115 obtains a user selection of a particular media item. In box 312, the playback module 115 determines a starting offset for the media item. If the playback is commencing at the beginning of the media item, the starting offset may be 0. In some cases, the starting offset may be advanced into the media item due to resuming paused playback, user-requested seeking, and/or for other reasons. The offset may be in bytes, frames, chunks, milliseconds, or some other measurement.

In box 315, the playback module 115 requests a portion of the media item from the streaming module 118 (FIGS. 1 & 2). In this regard, the playback module 115 may open a socket or other connection to the streaming module 118 and then issue a request for the portion of the media item. The communication may be via HTTP, RTP, RTSP, samba, or another streaming protocol. The request by the playback module 115 may specify the offset determined in box 312.

In some embodiments, the request may also specify a portion size. The playback module 115 may be configured to determine the portion size based at least in part on an amount of available memory or temporary data storage in the client device 103. For example, the playback module 115 may divide the amount of available memory by a constant factor, such as 8. Greater portion sizes may provide more flexibility if the user would like to seek ahead, but the portion size should be selected not to overwhelm the available memory. Smaller portion sizes reduce memory utilization and may be more secure. The constant factor may be selected to be a power of two. It is noted that the portion size may be determined dynamically and may vary from portion to portion based at least in part on the available memory.

In box 316, the playback module 115 obtains the requested portion of the media item from the streaming module 118. In box 318, the playback module 115 renders the portion of the media item using one or more output devices, such as the sound device 109 (FIGS. 1 & 2) or the display 106 (FIGS. 1 & 2). In box 321, the playback module 115 may remove the portion of the media item from the memory of the client device 103.

In box 324, the playback module 115 determines whether another portion of the media item is to be requested. If so, the playback module 115 returns to box 312 and determines the offset for the next portion. The offset may be determined as the previous offset plus a measure relating to the size of the last consumed portion. If another portion is not to be requested, the end of the media item (i.e., the final portion) has been reached, and the operation of the playback module 115 ends.

Figure 4:
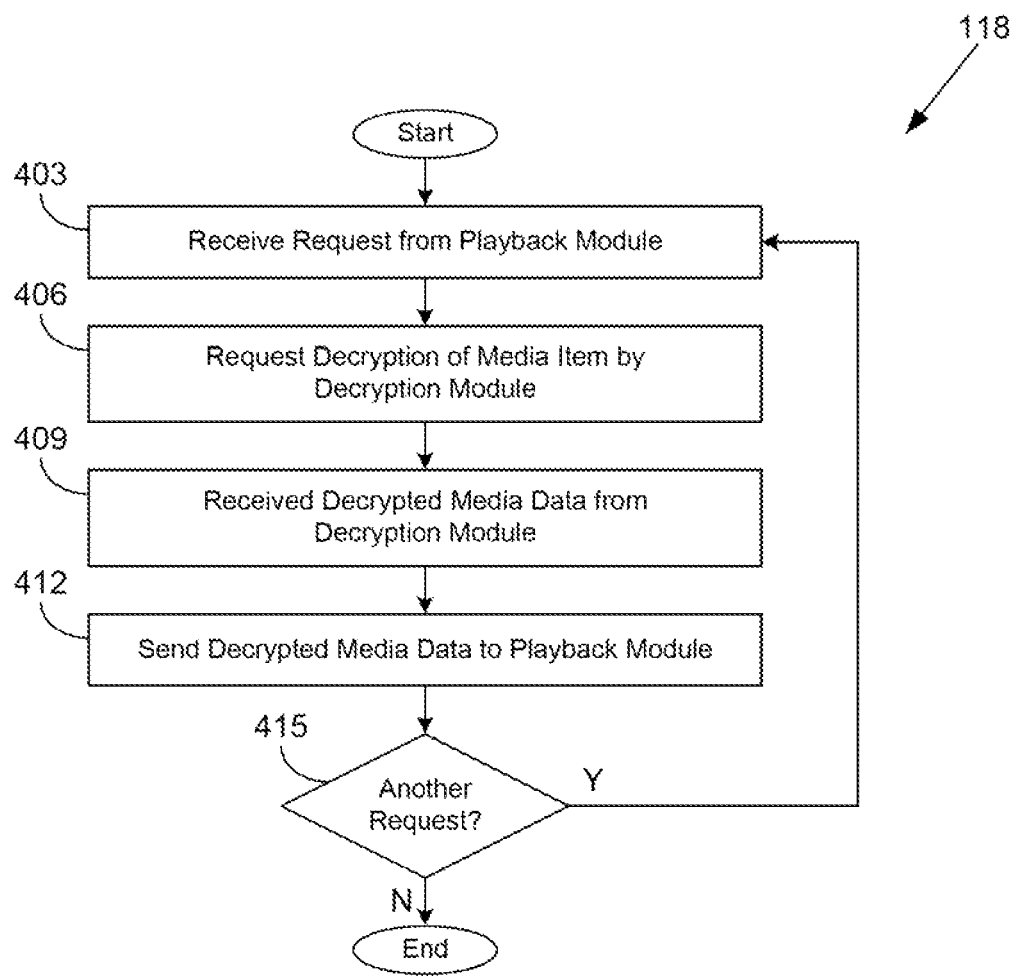
FIG. 4 is a flowchart illustrating one example of functionality implemented as portions of a streaming module executed in the client device of FIG. 1 or the computing environment of FIG. 2 according to various embodiments of the present disclosure.

Moving on to FIG. 4, shown is a flowchart that provides one example of the operation of a portion of the streaming module 118 according to various embodiments. It is understood that the flowchart of FIG. 4 provides merely an example of the many different types of functional arrangements that may be employed to implement the operation of the portion of the streaming module 118 as described herein. As an alternative, the flowchart of FIG. 4 may be viewed as depicting an example of elements of a method implemented in the client device 103 or the computing environment 203 (FIGS. 1 & 2) according to one or more embodiments.

Beginning with box 403, the streaming module 118 receives a request for a portion of a media item from a playback module 115 (FIGS. 1 & 2). The request may identify a specific media item and a starting offset. In some cases, the request may specify a size of the requested portion. In other cases, the streaming module 118 may calculate the size of the requested portion based at least in part on an amount of available memory in the client device 103. As a prerequisite, the streaming module 118 may authenticate the playback module 115 and confirm that the playback module 115 should have access to the media item.

In box 406, the streaming module 118 requests decryption of an encrypted media file 124 (FIGS. 1 & 2) by the decryption module 121 (FIGS. 1 & 2). The request by the streaming module 118 may specify an offset in the encrypted media file 124 and a size of the requested portion. In other embodiments, the decryption module 121 may determine the size of the requested portion. Also, it is noted that the specified size may pertain to the decrypted data and/or the encrypted media file 124. The decryption module 121 may be configured to store the decrypted media data in a temporary data storage, from which it supplies the decrypted media data to the streaming module 118.

In box 409, the streaming module 118 receives decrypted media data from the decryption module 121. The decryption module 121 may be configured to overwrite or erase the decrypted media data in a temporary data storage after providing the decrypted media data to the streaming module 118. As an example, a user may request that the playback module 115 perform a reverse play (i.e., a rewind) of media content. At the point that the user requests to perform the reverse play, the temporary data storage may have already been cleared, and thus the decryption module 121 would need to again decrypt the media content that was just viewed. That is to say, in one embodiment, after the decrypted media data is consumed the first time, it may be erased.

In box 412, the streaming module 118 sends the decrypted media data to the playback module 115 in response to the request. In one embodiment, the decrypted media data may be sent to the playback module 115 by way of an encrypted channel. In box 415, the streaming module 118 determines whether another request for a subsequent portion of the media item is received from the playback module 115. If another request is received, the streaming module 118 returns to box 403. Otherwise, the operation of the portion of the streaming module 118 ends.

Figure 5:
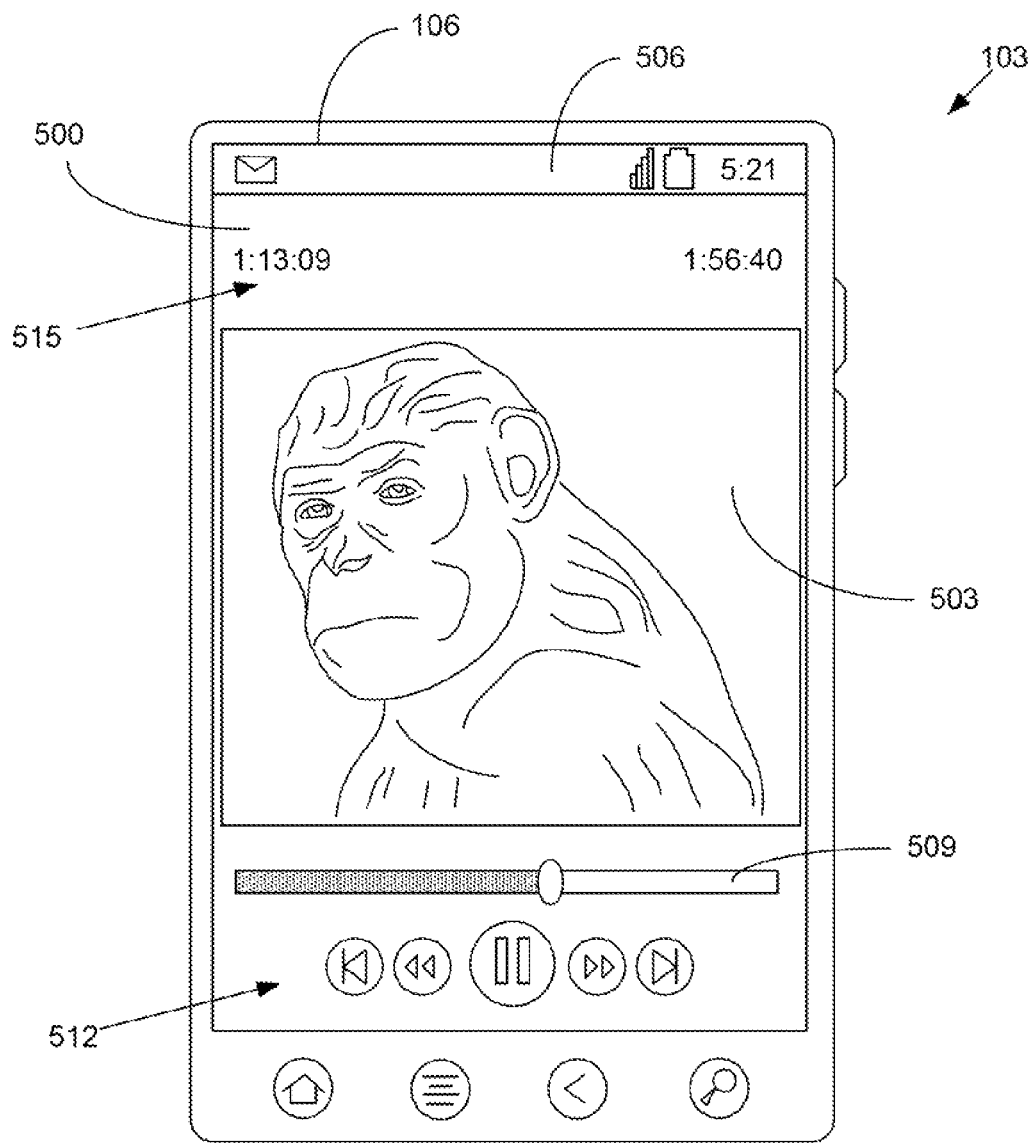
FIG. 5 is a pictorial diagram of an example media player user interface rendered in full-screen mode by the client device of FIG. 1 or 2 according to various embodiments of the present disclosure.

With reference to FIG. 5, shown is one example of a media player user interface 500 rendered upon a display 106 by a playback module 115 (FIGS. 1 & 2) executed in a client device 103 according to various embodiments of the present disclosure. The client device 103 may correspond to a mobile device executing a non-windowed operating system. The display 106 of the client device 103 may correspond to a touchscreen.

In one implementation, the playback module 115 comprises a service, which is an application component that can perform long-running operations in the background and ordinarily does not provide a user interface. Another application component can start a service, and the service may continue to run in the background even if the user switches to another application. The playback module 115 may implement a custom Frame Layout class, e.g., under an Android operating system platform. The Frame Layout may be configured to act as a floating window to which any views within layouts may be attached. Various touch listeners may be registered to this custom Frame Layout in order to recognize multi-touch gestures upon the display 106. For any other application to allow another window on top of the main window, a setting may be employed (e.g., in AndroidManifest.xml) that allows an application to open windows using the type TYPE_SYSTEM_ALERT on top of all other applications. Thus, the media player user interface 500 may be of a system alert type in order to be shown on top of other user interfaces.

In this example, the playback module 115 is rendering a video 503 in a full-screen mode. Despite being in a full-screen mode, a notifications bar 506 may be present. The media player user interface 500 may have a seek control 509 as well as other controls 512. The other controls 512 may include a previous item control, a next item control, a reverse seek control, a forward seek control, a pause control, a play control, a repeat control, a pop-out control, and/or other controls. The media player user interface 500 may also include other information 515 such as current time in the media item, time remaining in the media item, and so on.

Figure 6:
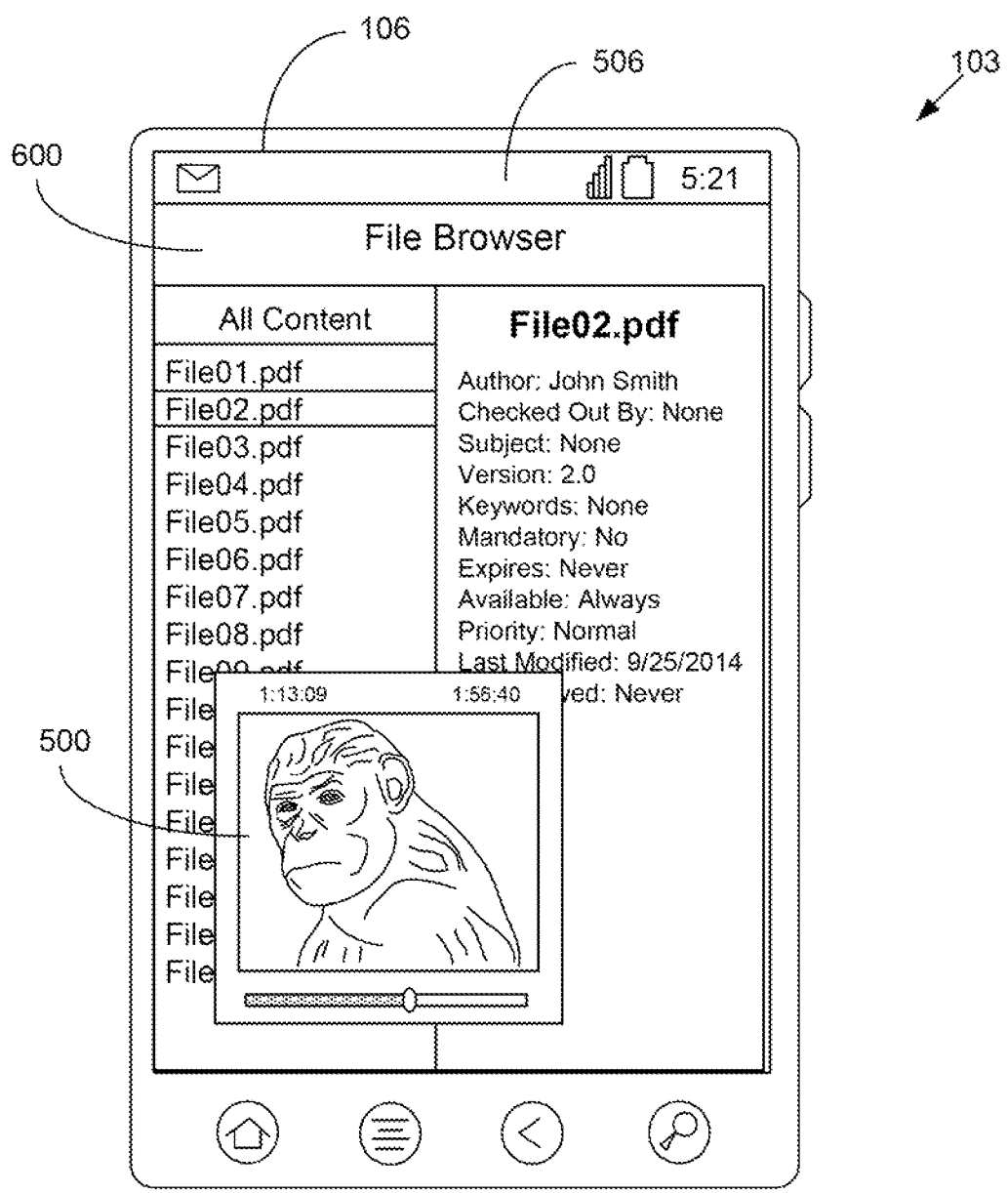
FIGS. 6-8 are pictorial diagrams of example media player user interfaces rendered in floating mode by the client device of FIG. 1 or 2 according to various embodiments of the present disclosure.

Turning now to FIG. 6, shown is another example of a media player user interface 500 rendered upon a display 106 by a playback module 115 (FIGS. 1 & 2) executed in a client device 103 according to various embodiments of the present disclosure. In this example, the media player user interface 500 has been "popped out" of full-screen mode and is now in floating mode. To this end, a pop-out control may have been activated, or a specific user gesture may have been performed (e.g., a double tap).

The media player user interface 500 has been sized smaller than before, thereby revealing a user interface 600 for another application executed in the client device 103. In this example, the other application corresponds to a file browser. As shown in FIG. 6, the media player user interface 500 occupies a first region of the display 106, while the user interface 600, in full-screen mode, occupies a second region of the display 106. The media player user interface 500 covers over and obscures a first portion of the user interface 600, while a second portion of the user interface 600 is visible.

The content of the media player user interface 500 has been simplified as compared to FIG. 5 in order to reduce the screen area. Also, it is noted that the user may interact with the user interface 600 while the playback module 115 continues to play back the media item in the media player user interface 500. The media player user interface 500 may remain on top of the user interface 600 during the user interaction. Optionally, the user may elect to return the media player user interface 500 to the full-screen mode as shown in FIG. 5 by way of a double tap, or another gesture. Also, the user may switch the user interface 600 to be the user interface of yet another application if desired, all while the playback module 115 continues playback.

Figure 7:
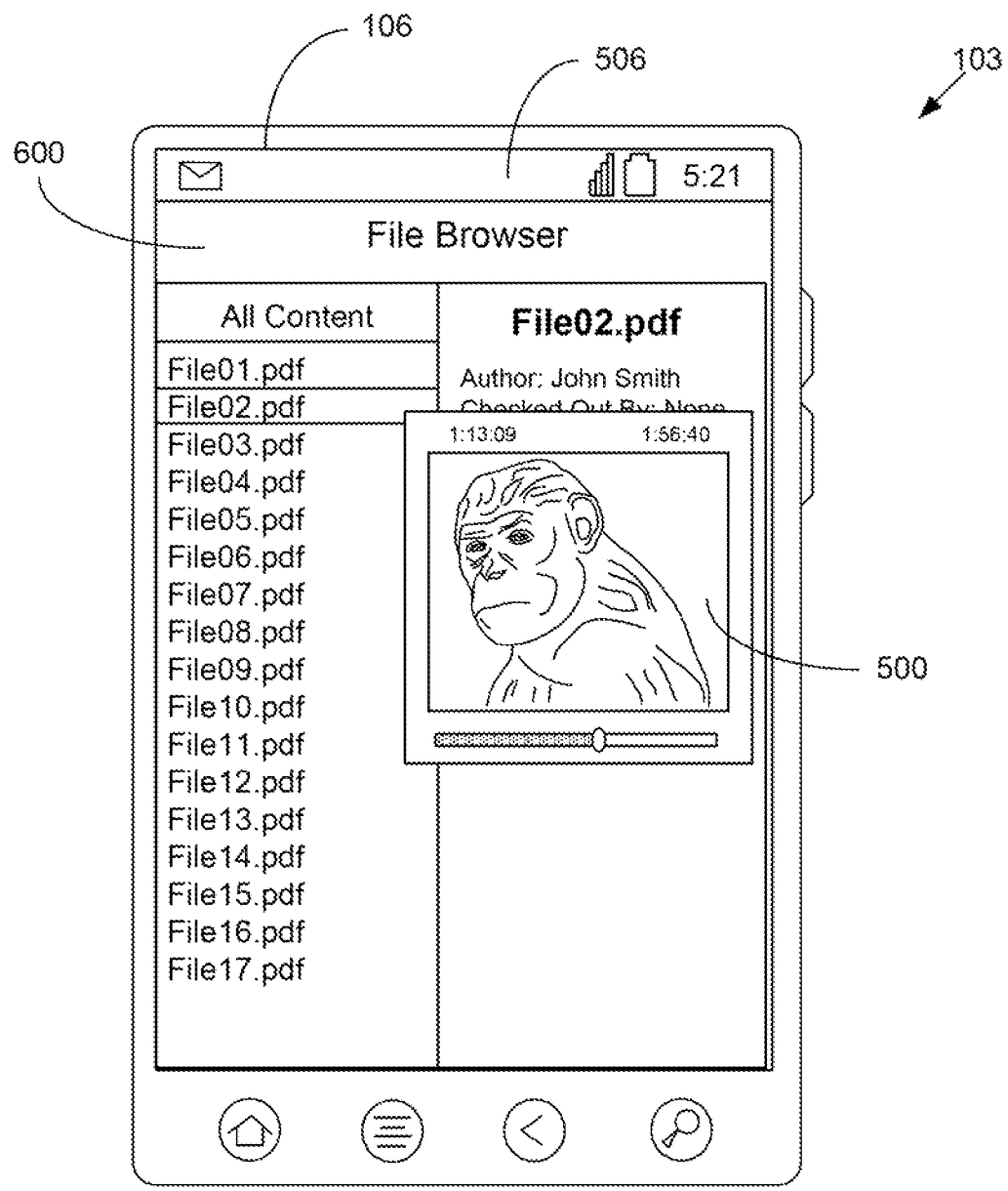

FIG. 7 illustrates a movement of the media player user interface 500 as compared to the example of FIG. 6. This is one type of transformation of the media player user interface 500. In this case, the user may have simply executed a drag gesture upon the media player user interface 500 and repositioned the media player user interface 500 relative to the user interface 600. The playback by the playback module 115 may continue during and/or after the movement of the media player user interface 500. As a consequence of the movement, a different portion of the user interface 600 is obscured by the media player user interface 500, and a different portion of the user interface 600 is revealed.

Figure 8:
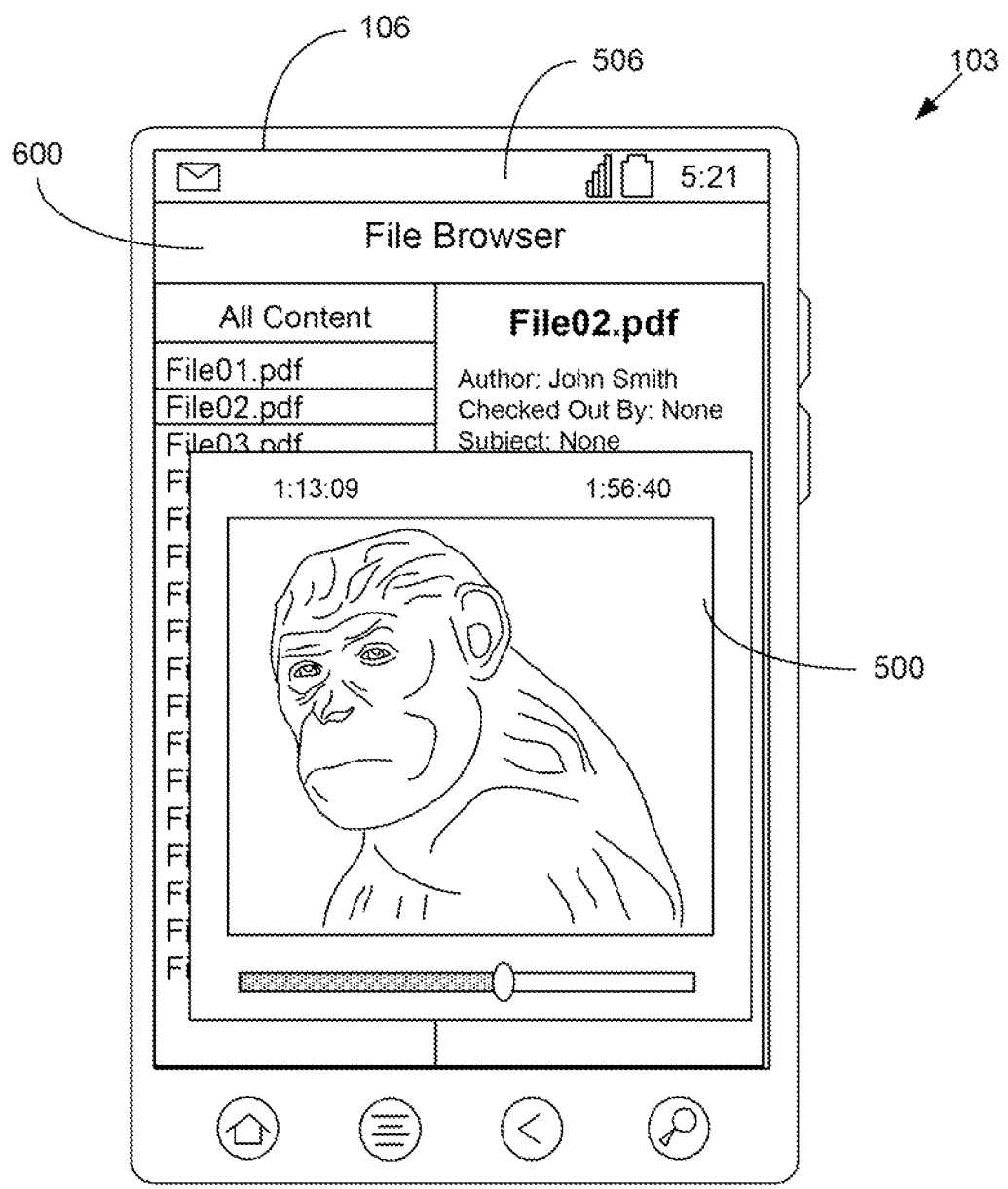

FIG. 8 illustrates a resizing of the media player user interface 500 as compared to the example of FIG. 6. This is another type of transformation of the media player user interface 500. The media player user interface 500 may recognize pinch gestures, zoom gestures, and/or other gestures to effect a resizing of the media player user interface 500. For example, the user may place two fingers close together upon the display 106 above the media player user interface 500 and then spread them apart (a zoom gesture) in order to resize the media player user interface 500 larger. Accordingly, a larger portion of the user interface 600 may be obscured by the larger media player user interface 500.

Similarly, the user may place two fingers spread apart upon the display 106 above the media player user interface 500 and then draw them closer together (a pinch gesture) in order to resize the media player user interface 500 smaller. Accordingly, a smaller portion of the user interface 600 may be obscured by a smaller media player user interface 500.

Figure 9:
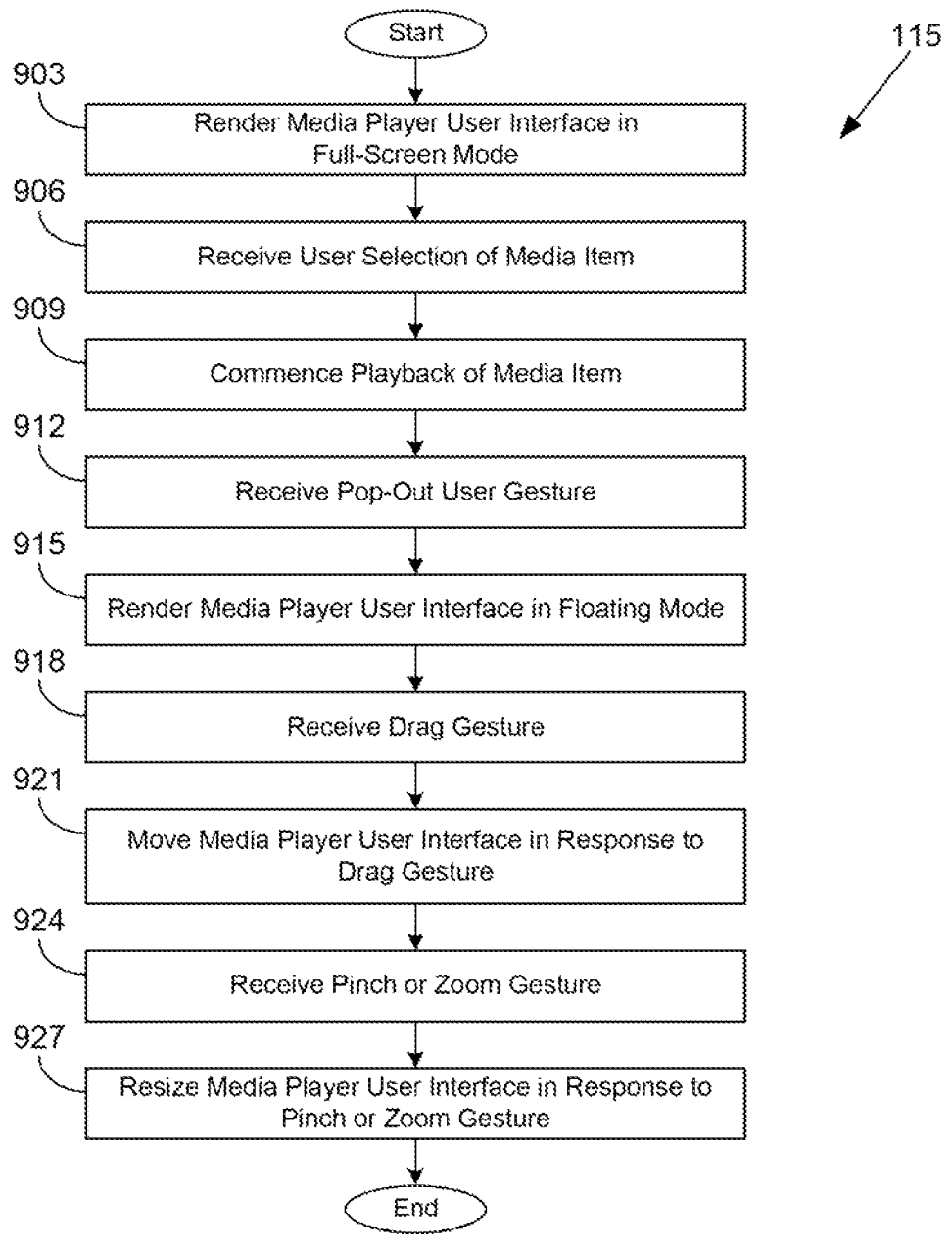
FIG. 9 is a flowchart illustrating one example of functionality implemented as portions of a playback module executed in the client device of FIG. 1 or 2 according to various embodiments of the present disclosure.

Continuing to FIG. 9, shown is a flowchart that provides one example of the operation of a portion of the playback module 115 according to various embodiments. It is understood that the flowchart of FIG. 9 provides merely an example of the many different types of functional arrangements that may be employed to implement the operation of the portion of the playback module 115 as described herein. As an alternative, the flowchart of FIG. 9 may be viewed as depicting an example of elements of a method implemented in the client device 103 (FIGS. 1 & 2) according to one or more embodiments.

Beginning with box 903, the playback module 115 renders a media player user interface 500 (FIG. 5) in a full-screen mode upon a display 106 (FIG. 5) of a client device 103 (FIG. 5). In box 906, the playback module 115 receives a selection of a media item by a user. In box 909, the playback module 115 commences playback of the selected media item.

In box 912, the playback module 115 receives a pop-out user gesture. For example, the user may double tap upon the media player user interface 500. Alternatively, the user may select a pop-out control. In box 915, the playback module 115 renders the media player user interface 500 in floating mode as in FIG. 6 in response to the pop-out user gesture.

In box 918, the playback module 115 may receive a drag gesture. In box 921, the playback module 115 moves the media player user interface 500 as in FIG. 7 in response to the drag gesture.

In box 924, the playback module 115 may receive a pinch or zoom gesture. In box 927, the playback module 115 resizes the media player user interface 500 as in FIG. 8 in response to the pinch or zoom gesture. Thereafter, the operation of the playback module 115 ends.

Although the media player user interfaces 500 of FIGS. 5-8 depict a rendering of a video 503, it is understood that the media player user interfaces 500 may pertain to playback of a slide show, purely audio, and/or other forms of media items in other examples. Such media items may include documents such as portable document format (PDF) documents, MICROSOFT OFFICE documents, and/or other documents. Also, various other gestures may be recognized. For example, a single tap gesture may cause playback by the playback module 115 to stop and/or be paused. Further, although FIGS. 5-8 depict client devices 103 that are mobile devices, it is understood that the principles of the present disclosure may be applied to workstations and/or non-mobile computing devices as well.

The flowcharts of FIGS. 3, 4, and 9 show examples of the functionality and operation of implementations of components described herein. The components described herein can be embodied in hardware, software, or a combination of hardware and software. If embodied in software, each element may represent a module of code or a portion of code that comprises program instructions to implement the specified logical function(s). The program instructions may be embodied in the form of, for example, source code that comprises human-readable statements written in a programming language and/or machine code that comprises machine instructions recognizable by a suitable execution system, such as a processor in a computer system or other system. If embodied in hardware, each element may represent a circuit or a number of interconnected circuits that implement the specified logical function(s).

Although the flowcharts show a specific order of execution, it is understood that the order of execution may differ from that which is shown. For example, the order of execution of two or more elements may be switched relative to the order shown. Also, two or more elements shown in succession may be executed concurrently or with partial concurrence. Further, in some embodiments, one or more of the elements shown in the flowcharts may be skipped or omitted. In addition, any number of counters, state variables, warning semaphores, or messages might be added to the logical flow described herein, for purposes of enhanced utility, accounting, performance measurement, troubleshooting aid, etc. It is understood that all such variations are within the scope of the present disclosure.

The computing environment 203, client device 103, and/or other components described herein may each include at least one processing circuit. Such a processing circuit may comprise, for example, one or more processors and one or more storage devices that are coupled to a local interface. The local interface may comprise, for example, a data bus with an accompanying address/control bus or any other suitable bus structure.

The one or more storage devices for a processing circuit may store data and/or components that are executable by the one or processors of the processing circuit. For example, the playback module 115, the streaming module 118, the decryption module 121, and/or other components may be stored in one or more storage devices and be executable by one or more processors. Also, a data store, such as the secure data store 112, may be stored in the one or more storage devices.

The playback module 115, the streaming module 118, the decryption module 121, and other components described herein may be embodied in the form of hardware, as software components that are executable by hardware, or as a combination of software and hardware. If embodied as hardware, the components described herein can be implemented as a circuit or state machine that employs any suitable hardware technology. Such hardware technology may include, for example but is not limited to, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs) and complex programmable logic devices (CPLDs)), etc.

Also, one or more or more of the components described herein that comprises software or program instructions can be embodied in any non-transitory computer-readable medium for use by or in connection with an instruction execution system such as, for example, a processor in a computer system or other system. Such a computer-readable medium may contain, store, and/or maintain the software or program instructions for use by or in connection with the instruction execution system.

The computer-readable medium can comprise a physical media, such as, magnetic, optical, semiconductor, and/or other suitable media. Examples of a suitable computer-readable media include, but are not limited to, solid-state drives, magnetic drives, flash memory, etc. Further, any logic or component described herein may be implemented and structured in a variety of ways. For example, one or more components described may be implemented as modules or components of a single application. Further, one or more components described herein may be executed in one computing device or by using multiple computing devices. Additionally, it is understood that terms such as "application," "service," "system," "engine," "module," and so on, may be interchangeable and are not intended to be limiting unless indicated otherwise.

Various embodiments of the present disclosure may be described by at least the following clauses:

1. A non-transitory computer-readable medium embodying at least one program executable in at least one computing device, comprising: a decryption module; a streaming module; a playback module configured to at least request media data from the streaming module and render the media data using at least one output device of the at least one computing device; the streaming module being configured to at least obtain the media data from the decryption module by a request specifying a size of the media data, the size being dynamically determined based at least in part on an amount of available temporary data storage; and the decryption module being configured to decrypt a portion of an encrypted media file based at least in part on the specified size to produce the media data.

2. The non-transitory computer-readable medium of clause 1, wherein the decryption module is further configured to at least place the media data in a temporary data storage once it is decrypted, the streaming module is further configured to at least obtain the media data from the decryption module by way of the temporary data storage, and the decryption module is further configured to at least cause the media data to be overwritten or erased from the temporary data storage once the media data has been obtained by the streaming module.

3. The non-transitory computer-readable medium of clause 1, wherein the media data comprises at least one of: video data, audio data, document data or slide show data.

4. The non-transitory computer-readable medium of clause 1, wherein the streaming module is configured to transfer the media data to the playback module via a streaming protocol.

5. The non-transitory computer-readable medium of clause 1, wherein the playback module is configured to request the media data beginning at a specified offset.

6. The non-transitory computer-readable medium of clause 1, wherein the playback module is configured to continue requesting the media data from the streaming module until an end of the encrypted media file is reached.

7. A client device configured to at least: identify, by a playback module, a media item; request, by the playback module, a first portion of the media item from a streaming module; obtain, by the streaming module, the first portion of the media item from a decryption module; decrypt, by the decryption module, the first portion of the media item from an encrypted media file; deliver, by the decryption module, the first portion of the media item to the streaming module; and deliver, by the streaming module, the first portion of the media item to the playback module.

8. The client device of clause 7, being further configured to at least: determine an amount of available temporary data storage of the client device; and determine a size of the first portion of the media item by dividing the amount of available temporary data storage by a constant factor.

9. The client device of clause 7, being further configured to at least: obtain, by the playback module, a user selection of the media item from a listing of a plurality of media items.

10. The client device of clause 7, being further configured to at least: render, by the playback module, the first portion of the media item using at least one of: a display device of the client device or a sound device of the client device.

11. The client device of clause 7, wherein the playback module is configured to request the first portion of the media item at a starting offset.

12. A method, comprising: decrypting, by a decryption service of at least one computing device, an encrypted media file to generate decrypted media data; supplying, by the decryption service of the at least one computing device, a portion of the decrypted media data to a streaming service of the at least one computing device in response to a first request, wherein the first request is made by the streaming service; and sending, by the streaming service of the at least one computing device, the portion of the decrypted media data to a playback service of the at least one computing device in response to a second request, wherein the second request is made by the playback service.

13. The method of clause 12, further comprising rendering, by the playback service of the at least one computing device, the portion of the decrypted media data using at least one output device of the at least one computing device.

14. The method of clause 12, further comprising generating, by the streaming service of the at least one computing device, the first request, the first request specifying an offset in the decrypted media data.

15. The method of clause 12, further comprising generating, by the playback service of the at least one computing device, the second request, the second request specifying an offset in the decrypted media data.

16. The method of clause 12, wherein the playback service, the streaming service, and the decryption service are executed in a single computing device.

17. The method of clause 12, wherein the playback service and the streaming service are executed in separate computing devices.

18. The method of clause 12, wherein the streaming service comprises a hypertext transfer protocol (HTTP) server, and the streaming service sends the portion of the decrypted media data to the playback service via HTTP.

19. The method of clause 12, wherein the streaming service sends the portion of the decrypted media data to the playback service via an encrypted channel.

20. The method of clause 12, further comprising: determining, by the at least one computing device, an amount of available temporary data storage in the at least one computing device; and determining, by the at least one computing device, a size of the portion of the decrypted media data based at least in part on the amount of available temporary data storage.

21. A non-transitory computer-readable medium embodying a service executable in a mobile device, comprising: code that identifies a media item; code that obtains data corresponding to the media item; code that performs a playback of the media item using at least one output device of the mobile device; code that renders a first user interface corresponding to the playback of the media item upon a display of the mobile device, the first user interface being rendered in a first region of the display such that a second user interface corresponding to another application is visible in a second region of the display, the first user interface being of a system alert type; code that facilitates a movement of the first user interface on the display in response to a first user gesture; and code that facilitates a resizing of the first user interface on the display in response to a second user gesture.

22. The non-transitory computer-readable medium of clause 21, wherein the first user interface is on top of the second user interface such that the first user interface obscures a portion of the second user interface.

23. The non-transitory computer-readable medium of clause 22, wherein the first user interface is configured to remain on top of the second user interface during a user interaction involving the second user interface.

24. The non-transitory computer-readable medium of clause 21, wherein the mobile device executes a non-windowed operating system.

25. The non-transitory computer-readable medium of clause 21, wherein the playback of the media item is not stopped by the movement or the resizing.

26. The non-transitory computer-readable medium of clause 21, wherein the media item comprises a video.

27. A client device configured to at least: render a first user interface of a media player in a first region upon a display of the client device, the client device having a non-windowed operating system, the first user interface being of a system alert type; render a second user interface of another application in a second region upon the display, the first user interface partially overlapping the second user interface such that a first portion of the second user interface is obscured by the first user interface and a second portion of the second user interface is visible; receive a user gesture; and apply a transformation to the first user interface in response to the user gesture.

28. The client device of clause 27, wherein the first user interface is rendered by a service executed in the client device.

29. The client device of clause 28, wherein the non-windowed operating system is an Android operating system, and the service implements a Frame Layout class.

30. The client device of clause 27, wherein the transformation comprises at least one of a movement of the first user interface or a resizing of the first user interface.

31. The client device of clause 27, wherein the user gesture is a drag gesture, and the client device is configured to at least move the first user interface in response to the drag gesture.

32. The client device of clause 27, wherein the user gesture is a pinch or zoom gesture, and the client device is configured to at least resize the first user interface in response to the pinch or zoom gesture.

33. The client device of clause 27, wherein the client device is configured to at least render a video playback of a media item in the first user interface.

34. The client device of clause 27, wherein the client device is configured to at least render the first user interface on top of the second user interface upon the display during a user interaction involving the second user interface.

35. The client device of clause 27, wherein the client device is configured to at least render a seek control for a media item in the first user interface.

36. The client device of clause 27, wherein the client device is configured to at least pause a playback of a media item by the media player in response to receiving a single tap gesture above the first user interface.

37. A method, comprising: rendering, by a client device having a non-windowed operating system, a first user interface upon a display, the first user interface corresponding to a media player; commencing, by the client device, a playback of a media item in the first user interface; receiving, by the client device, a first user gesture; resizing, by the client device, the first user interface to expose a portion of a second user interface upon the display below the first user interface in response to the first user gesture, the second user interface corresponding to another application; receiving, by the client device, a second user gesture; and moving, by the client device, the first user interface so that a different portion of the second user interface is rendered upon the display in response to the second user gesture.

38. The method of clause 37, wherein the first user interface is rendered in a full-screen mode before the first user gesture is received, and the second user interface is rendered in the full-screen mode under the first user interface.

39. The method of clause 37, further comprising continuing, by the client device, the playback of the media item while the portion or the different portion of the second user interface is rendered upon the display.

40. The method of clause 37, further comprising: receiving, by the client device, a third user gesture over the second user interface during the playback of the media item; and providing, by the client device, user input corresponding to the third user gesture to the other application.

It is emphasized that the above-described embodiments of the present disclosure are merely examples of implementations to set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

The invention claimed is:

1. A non-transitory computer-readable medium embodying at least one program executable in at least one computing device comprising a processor, comprising:
   a decryption module executable by the processor;
   a streaming module executable by the processor;
   a playback module executable by the processor and configured to at least request media data from the streaming module and render the media data using at least one output device of the at least one computing device;
   the streaming module being configured to at least obtain the media data from the decryption module by a request specifying a size of the media data, the size being dynamically determined based at least in part on an amount of available temporary data storage;
   the decryption module being configured to decrypt a portion of an encrypted media file based at least in part on the specified size to produce the media data; and
   the playback module being configured to request the media data beginning at a specified offset and to continue requesting the media data from the streaming module until an end of the encrypted media file is reached.

2. The non-transitory computer-readable medium of claim 1, wherein the decryption module is further configured to at least place the media data in a temporary data storage once it is decrypted, the streaming module is further configured to at least obtain the media data from the decryption module by way of the temporary data storage, and the decryption module is further configured to at least cause the media data to be overwritten or erased from the temporary data storage once the media data has been obtained by the streaming module.

3. The non-transitory computer-readable medium of claim 1, wherein the media data comprises at least one of: video data, audio data, document data or slide show data.

4. The non-transitory computer-readable medium of claim 1, wherein the streaming module is configured to transfer the media data to the playback module via a streaming protocol.

5. The non-transitory computer-readable medium of claim 1, wherein the streaming module comprises a hypertext transfer protocol (HTTP) server, and the streaming module sends the media data to the playback module via HTTP.

6. The non-transitory computer-readable medium of claim 1, wherein the streaming module and the playback module are executed in separate computing devices.

7. A client device comprising a processor and a memory storing executable instructions, wherein when executed the instructions cause the processor to at least:
   identify, by a playback module, a media item;
   request, by the playback module, a first portion of the media item from a streaming module beginning at a specified offset, wherein the playback module is configured to continue requesting the media item from the streaming module until an end of an encrypted media file is reached;
   obtain, by the streaming module, the first portion of the media item from a decryption module;
   decrypt, by the decryption module, the first portion of the media item from the encrypted media file;
   deliver, by the decryption module, the first portion of the media item to the streaming module; and
   deliver, by the streaming module, the first portion of the media item to the playback module.

8. The client device of claim 7, being further configured to at least:
   determine an amount of available temporary data storage of the client device; and
   determine a size of the first portion of the media item by dividing the amount of available temporary data storage by a constant factor.

9. The client device of claim 7, being further configured to at least:
   obtain, by the playback module, a user selection of the media item from a listing of a plurality of media items.

10. The client device of claim 7, being further configured to at least:
   render, by the playback module, the first portion of the media item using at least one of: a display device of the client device or a sound device of the client device.

11. The client device of claim 7, wherein the streaming module delivers the first portion of the media item to the playback module via an encrypted channel.

12. A method, comprising:
   decrypting, by a decryption service of at least one computing device comprising a processor, an encrypted media file to generate decrypted media data;
   supplying, by the decryption service of the at least one computing device, a portion of the decrypted media data to a streaming service of the at least one computing device in response to a first request, wherein the first request is made by the streaming service; and
   sending, by the streaming service of the at least one computing device, the portion of the decrypted media data to a playback service of the at least one computing device in response to a second request, wherein the second request is made by the playback service beginning at a specified offset, wherein the playback service is configured to continue requesting the decrypted media data from the streaming service until an end of the encrypted media file is reached.

13. The method of claim 12, further comprising rendering, by the playback service of the at least one computing device, the portion of the decrypted media data using at least one output device of the at least one computing device.

14. The method of claim 12, further comprising generating, by the streaming service of the at least one computing device, the first request, the first request specifying an offset in the decrypted media data.

15. The method of claim 12, further comprising generating, by the playback service of the at least one computing device, the second request, the second request specifying the specified offset in the decrypted media data.

16. The method of claim 12, wherein the playback service, the streaming service, and the decryption service are executed in a single computing device.

17. The method of claim 12, wherein the playback service and the streaming service are executed in separate computing devices.

18. The method of claim 12, wherein the streaming service comprises a hypertext transfer protocol (HTTP) server, and the streaming service sends the portion of the decrypted media data to the playback service via HTTP.

19. The method of claim 12, wherein the streaming service sends the portion of the decrypted media data to the playback service via an encrypted channel.

20. The method of claim 12, further comprising:
   determining, by the at least one computing device, an amount of available temporary data storage in the at least one computing device; and
   determining, by the at least one computing device, a size of the portion of the decrypted media data based at least in part on the amount of available temporary data storage.

\* \* \* \* \*